United States Patent Office 2,767,231
Patented Oct. 16, 1956

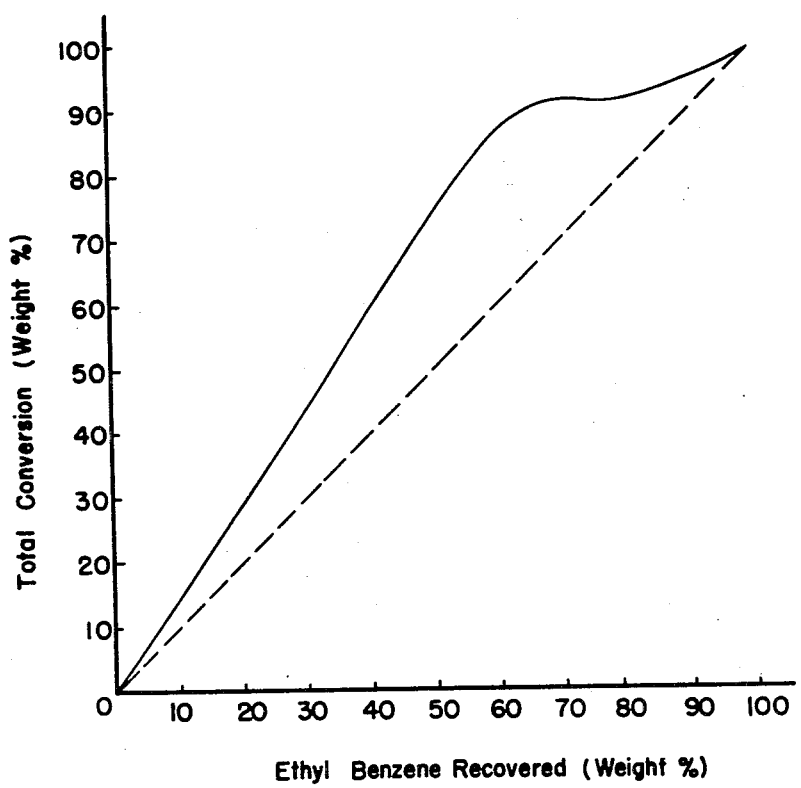

2,767,231

SEPARATION OF POLYALKYL AROMATIC HYDROCARBONS

Robert M. Kennedy, Newtown Square, and Conard K. Donnell, Springfield, Pa., assignors to Sun Oil Company, Philadelphia, Pa., a corporation of New Jersey Application March 30, 1953, Serial No. 345,558

6 Claims. (Cl. 260—672)

This invention relates to the separation or concentration of dialkyl aromatic hydrocarbons from admixtures thereof with trialkyl aromatic isomers.

The separation of isomeric aromatic hydrocarbons is usually difficult because their boiling points fall within a relatively narrow range so that their separation by fractionation or other physical means is not practical.

An object of the present invention is to provide a process for the separation of isomeric polyalkyl aromatic hydrocarbons. Another object of the present invention is to provide a process for the separation or concentration of dialkyl aromatic hydrocarbons from an admixture thereof with trialkyl aromatic hydrocarbons. A specific object is to provide a process for the concentration of tertiary-butylethylbenzene from an admixture thereof with its isomers which are trialkyl aromatic hydrocarbons.

It has now been found that by subjecting an admixture of a dialkyl aromatic hydrocarbon having one tertiary alkyl radical attached to the benzene nucleus through the tertiary carbon atom with at least one isomer thereof which is a trialkyl aromatic hydrocarbon having one tertiary alkyl radical which is the same as the tertiary alkyl radical of the dialkyl aromatic, and which is also connected through the tertiary carbon atom to the benzene nucleus, to a dealkylating catalyst under dealkylating conditions, as hereinafter described, the tertiary alkyl radical of the trialkyl aromatic is selectively cleaved so that if not more than 91% of the polyalkyl aromatics are dealkylated, the mixture of recovered unaffected polyalkyl aromatics has a decreased concentration of the trialkyl aromatic as compared to the original mixture, i. e., the recovered unaffected polyalkyl aromatics have an increased concentration of the dialkyl aromatic as compared to the concentration thereof in the original mixture. Alkyl radicals of from 1 to 4 carbon atoms which are attached to the benzene nucleus through non-tertiary carbon atoms are not affected in the process. The following description of the process of the invention is principally directed to the separation of t-butylethylbenzene from mixtures thereof with its dimethylbenzene isomers, such as 1,3-dimethyl-5-t-butylbenzene. The process, however, is limited as only hereinafter indicated.

The accompanying figure is a graph showing selective dealkylation of trialkyl aromatics as compared to the dealkylation of dialkyl aromatics, and is more fully explained hereinafter.

In accordance with the present invention, an admixture containing a t-butylethylbenzene and a t-butyl-substituted xylene, such as a t-butyl meta-xylene, a t-butyl ortho-xylene, or an admixture thereof, is subjected to a dealkylating catalyst under dealkylating conditions selected so that not more than a total of 91% of the t-butyl aromatics are dealkylated. It has been found that t-butyl-substituted xylenes are dealkylated by scission of the t-butyl group much more readily than t-butylethylbenzene under the conditions hereinafter described, so that on distillation of the admixture from dealkylation, the unaffected polyalkyl aromatics contain a relatively large proportion of t-butylethylbenzene as compared to the concentration thereof in the original admixture. The process of the present invention therefore provides a process for the separation or concentration of certain dialkyl aromatic hydrocarbons from isomers thereof which are trialkyl aromatic hydrocarbons.

Dialkyl aromatic hydrocarbons which can be separated or concentrated in the present process may be represented by the formula

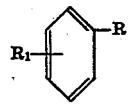

wherein R is a tertiary alkyl radical attached through the tertiary carbon atom to the benzene nucleus, and preferably contains a total of not more than 16 carbon atoms, and $R_1$ is an alkyl radical having from 2 to 4 carbon atoms and is attached through a primary or secondary carbon atom, i. e., by a non-tertiary carbon atom, to the benzene nucleus. $R_1$ may be in ortho-, meta-, or para-relationship with respect to the tertiary alkyl radical R. As illustrative of dialkyl benzenes which may be employed in the present process, 1-t-butylethylbenzene, 2-t-butylethylbenzene, 3-t-butylethylbenzene, 1-t-amylethylbenzene, 2-t-hexylethylbenzene, 2-t-heptylethylbenzene, 3-t-octylethylbenzene, and isomers and homologs thereof may be employed with good results.

The trialkyl constituent of the reaction mixture is an isomer of the dialkyl aromatic and may be illustrated by the formula

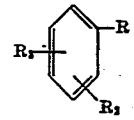

wherein R is as described for the dialkyl aromatic and in a given admixture is identical therewith. $R_2$ and $R_3$ are alkyl radicals of from 1 to 3 carbon atoms, and are attached through primary or secondary carbon atoms, i. e., by a non-tertiary carbon atom, to the benzene nucleus. The sum of the carbon atoms of $R_2$ and $R_3$ must be equal to the number of carbon atoms of $R_1$ so that the trialkyl aromatic is an isomer of the dialkyl aromatic. As illustrative of trialkyl aromatic hydrocarbons which can be separated or concentrated in accordance with the invention, the t-alkyl-substituted o-xylenes, such as 1,2-dimethyl-3-t-butylbenzene and 1,2-dimethyl-5-t-butylbenzene; the t-alkyl-substituted m-xylenes, such as 1,3-dimethyl-4-t-butylbenzene and 1,3-dimethyl-5-t-butylbenzene; the t-butylmethylethylbenzenes; the t-butyldiethylbenzenes such as 1,3-diethyl-4-t-butylbenzene; mixtures of the t-butyldiethylbenzenes such as 1,3-diethyl-4-t-butylbenzene; mixtures of the foregoing which are isomers, and homologs and isomers thereof, give good results.

Admixtures employed in the process of the present invention, as above described, contain substantial quantities of both the dialkyl aromatic and at least one trialkyl isomer thereof. Accordingly, admixtures of dialkyl aromatics and trialkyl aromatics such as admixtures of: t-butylethylbenzene, a t-butyl-substituted o-xylene and a t-butyl-substituted m-xylene; t-amylethylbenzene, a t-amyl-substituted o-xylene and a t-amyl-substituted m-xylene; t-butyl-n-propylbenzene and a t-butyl-substituted methylethylbenzene; t-butyl-n-butylbenzene and a t-butyl-substituted diethylbenzene; and the like, can be employed with good results.

As described, the initial admixture should contain substantial proportions of both the dialkyl and trialkyl aromatics. By "substantial proportions" is meant at least 5% by volume of each of these components. For example, the mixture may contain 5% of the dialkyl aromatic and 95% of the trialkyl aromatic, or 5% of the trialkyl aromatic and 95% of the dialkyl aromatic. Other hydrocarbons which do not intefere with the process may be present, such as normal paraffins and naphthenes, but it is preferred to maintain the concentration of inert reactants below 75% by volume, and it is essential that both the dialkyl aromatic and trialkyl aromatic be present in concentrations of at least 5% by volume.

Various cracking catalysts may be employed in the present process. Silica-alumina mixtures containing from about 50 to 95% silica and 50 to 5% alumina are preferred. Other metallic oxides may be employed therewith in minor amounts. Other cracking catalysts, such as silica-zirconia, silica-alumina-zirconia, silica-magnesia, fuller's earth, Attapulgus clay and bauxite may be employed. When using naturally occurring minerals or clays, such as Attapulgus clay or bauxite, it is advantageous to first acid treat the catalyst to increase its activity. The activity of the catalyst, as hereinafter defined, must be above about 20, and preferably is from 25 to 50.

The temperature may be varied from 350° C. to 550° C., and good results obtained therewith, but preferably the temperature is maintained within the range of from 400° C. to 500° C. The pressure is preferably maintained from atmospheric to 100 p. s. i. g., but sub-atmospheric pressures can be employed in some instances with good results. The space rate, or liquid hourly space velocity, which is the volume of hydrocarbons charged per volume of catalyst per hour (v./v./hr.), should be maintained from 1 to 12, and preferably from 5 to 12. It is essential that the above described dealkylating conditions be correlated so that the total conversion is not above 91% by weight, i. e., so that not more than 91% by weight of the polyalkyl aromatics having a t-alkyl radical are converted to a lower substituted alkyl aromatic by scission of the t-alkyl radical. If the conditions of operation are such that a total conversion of more than 91% is obtained, effective concentration of the dialkyl aromatic is not obtained. The total conversion should be at least 20% and preferably is at least 60%, in order to obtain substantial concentration of the dialkyl aromatic without excessive recycling. Maintaining the space rate within the range of 5 to 12 is an advantageous method of obtaining the desired total conversion within the defined range, and gives other advantages as hereinafter described.

The following examples are presented to illustrate the process of the invention. In the examples, the charge stocks employed were mixtures of t-butylxylenes and t-butylethylbenzene. These admixtures were prepared by subjecting a mixture of butylene, xylenes and ethylbenzene to alkylating conditions in the presence of hydrogen fluoride so that the butylene was alkylated by the aromatics, and separating hydrogen fluoride and unreacted materials. For a given substituted xylene or substituted ethylbenzene, the location of the t-butyl radical is not important. For example 1,2-dimethyl-4-t-butylbenzene and 1,2-dimethyl-3-t-butylbenzene give equivalent results, and 1-ethyl-2-t-butylbenzene and 1-ethyl-3-t-butylbenzene give equivalent results. Hence, no distinction is made between the various t-butyl-o-xylenes, for example, and such isomers and mixtures thereof are herein broadly designated as t-butyl-o-xylene. Likewise, no distinction is made between the various t-butylethylbenzenes. By "activity," as herein used with reference to catalyst activity, is meant the efficacy of a catalyst for cracking hydrocarbons, and is determined by the method described by Alexander, Proceedings Am. Pet. Inst., 27 (III), 51 (November 1947).

*Example 1*

A mixture containing, in volume percent, tertiary butyl-o-xylene=17.9; tertiary butyl meta-xylene=56.2; tertiary butyl-p-xylene=4.3; and tertiary butylethylbenzene=21.6 was passed in vapor phase at a liquid hourly space velocity of 1 over Attapulgus clay which had been leached for one hour with concentrated hydrochloric acid at 25° C., washed free of acid and dried. The catalyst had an activity of from 20 to 25. The temperatures employed are as shown in the following table. The products were collected over a period of at least 2 hours and the debutylated alkyl aromatics separated from the unaffected aromatics. Results obtained are as shown in the following Table I:

TABLE I

|  | Run 1 | Run 2 | Run 3 | Run 4 |
| --- | --- | --- | --- | --- |
| Temperature (° C.) | 475 | 475 | 450 | 450 |
| Products (Wt. Percent of charge): |  |  |  |  |
| xylene fraction | 14.39 | 28.05 | 36.33 | 44.55 |
| unaffected charge stock | 69.30 | 45.90 | 31.90 | 22.80 |
| Total conversion (Wt. Percent) | 30.7 | 54.1 | 68.1 | 77.2 |
| Composition of xylene fraction (Vol. Percent): |  |  |  |  |
| o-xylene | 18 | 17 | 15 | 15 |
| m-xylene | 42 | 49 | 51 | 55 |
| p-xylene | 6 | 4 | 6 | 5 |
| ethylbenzene | 4 | 9 | 11 | 13 |
| Conversion of t-butyl ethylbenzene (Wt. Percent) | 18.5 | 41.6 | 51.0 | 60.0 |

Other products obtained were isobutylene, minor amounts of isobutane, and diisobutylene.

These data show that the conversion of t-butylethylbenzene to ethylbenzene is substantially less than the conversion of t-butyl xylenes to the corresponding xylenes, i. e., the concentration of t-butylethylbenzene in the unaffected residue was substantially increased.

*Example 2*

Example 1 was substantially repeated except that the charge stock, in volume percent, consisted of tertiary butyl-o-xylene=17.3; tertiary butyl-m-xylene=56.6; tertiary butyl-p-xylene=6.1; and tertiary butylethylbenzene=20. The same catalyst and operating conditions were employed as for Example 1, except the temperatures employed were as given in the following Table II.

*Table II*

|  | Run 1 | Run 2 | Run 3 | Run 4 | Run 5 |
| --- | --- | --- | --- | --- | --- |
| Temperature (° C.) | 400 | 400 | 425 | 425 | 400 |
| Products (Wt. Percent of charge): |  |  |  |  |  |
| xylene fraction | 31.29 | 35.70 | 37.56 | 41.93 | 48.64 |
| unaffected residue | 42.30 | 33.80 | 34.80 | 24.50 | 14.30 |
| Total conversion (Wt. percent) | 57.7 | 66.2 | 65.2 | 75.5 | 85.7 |
| Composition of xylene fraction (Vol. percent): |  |  |  |  |  |
| o-xylene | 17 | 17 | 17 | 14 | 14 |
| m-xylene | 51 | 55 | 54 | 56 | 57 |
| p-xylene | 7 | 7 | 6 | 6 | 6 |
| ethylbenzene | 7 | 6 | 10 | 9 | 11 |
| Conversion of t-butyl ethylbenzene (Wt. percent) | 35 | 30 | 50 | 45 | 55 |

Other products obtained were isobutylene, minor amounts of isobutane, and diisobutylene.

*Example 3*

The procedure of Example 1 was substantially repeated using different operating conditions and a different catalyst. The charge stock, in volume percent, consisted of tertiary butyl-o-xylene=5; tertiary butyl-m-xylene=76; tertiary butyl-p-xylene=6; and tertiary butylethylbenzene=13. The catalyst was a silica-alumina composition consisting of 88% silica and 12% alumina, and had previously been employed in a commercial process for cracking hydrocarbons until its activity decreased from 34 to about 28. Operating conditions including the time during which the product was collected, and results obtained, are shown in the following Table III.

Table III

|  | Run 1 | Run 2 | Run 3 |
|---|---|---|---|
| Temperature (° C.) | 400 | 400 | 400 |
| Liquid hourly space velocity (v./v./hr.) | 5.6 | 2.9 | 1 |
| Products (Wt. percent of charge): | | | |
| xylene fraction | 51.7 | 59.2 | 61.4 |
| unaffected residue | 20.4 | 11.1 | 4.1 |
| Total conversion (Wt. percent) | 79.6 | 88.9 | 95.9 |
| Composition of xylene fraction (Vol. percent): | | | |
| o-xylene | 3 | 5 | 12 |
| m-xylene | 84 | 78 | 69 |
| p-xylene | 6 | 7 | 7 |
| ethylbenzene | 7 | 10 | 12 |
| Conversion of t-butyl ethylbenzene (Wt. percent) | 54 | 77 | 92.4 |

Other products obtained were isobutylene and minor amounts of isobutane. No diisobutylene was observed.

Example 4

The procedure of Example 1 was substantially repeated using different operating conditions and a different catalyst. The charge stock, in volume percent, consisted of tertiary butyl-o-xylene=5; tertiary butyl-m-xylene=76; tertiary butyl-p-xylene=6; and tertiary butylethylbenzene=13. The catalyst was a freshly prepared silica-alumina composition containing 88% silica and 12% alumina, and had an activity of 46. Operating conditions and results obtained are shown in the following Table IV.

Table IV

|  | Run 1 | Run 2 |
|---|---|---|
| Temperature (° C.) | 400 | 450 |
| Liquid hourly space velocity (v./v./hr.) | 0.55 | 10.9 |
| Products (Vol. percent): | | |
| xylene fraction | 59.3 | 57.4 |
| unaffected residue | 6.6 | 4.8 |
| Total conversion (Wt. percent) | 93 | 95.2 |
| Composition of xylene fraction (Vol. percent): | | |
| o-xylene | 13 | 8 |
| m-xylene | 67 | 76 |
| p-xylene | 7 | 8 |
| ethylbenzene | 8 | 8 |
| Conversion of t-butyl ethylbenzene (Weight percent) | 61.5 | 61.5 |

Other products obtained were isobutylene, minor amounts of isobutane, and diisobutylene.

Example 5

The procedure of Example 1 was substantially repeated using the catalyst as described therein. The charge stock, in volume percent, consisted of tertiary butyl-o-xylene=5; tertiary butyl-m-xylene=76; tertiary butyl-p-xylene=6; and tertiary butylethylbenzene=13. The temperature was maintained at 450° C. and a liquid hourly space velocity (v./v./hr.) of 2 was employed.

The products, in weight percent of the charge, were unaffected charge stock=8.1 and xylene fraction=59.3. Isobutylene, a minor amount of isobutane and some diisobutylene were also observed. Total conversion, in weight percent, was 91.9. The xylene fraction, in volume percent, consisted of: o-xylene=7; m-xylene=75; p-xylene=6; and ethylbenzene=10. Conversion of t-butylethylbenzene was 77% by weight.

Example 6

The procedure of Example 1 was substantially repeated using the same Attapulgus clay catalyst described therein. The charge stock, in volume percent consisted of t-octyl-o-xylene=5; t-octyl-m-xylene=75; t-octyl-p-xylene=7; and t-octylethylbenzene=13. The temperature was maintained at 425° C. and a liquid hourly space velocity (v./v./hr.) of 0.83 was employed.

The products, in weight percent of the charge, were unaffected charge stock=7.1 and xylene fraction=53.5. Total conversion, in weight percent, was 92.9%. The xylene fraction, in volume percent, consisted of: o-xylene=5; m-xylene=74; p-xylene=7; and ethylbenzene=7. Conversion of t-octylethylbenzene was 54% by weight.

Other products obtained were, in weight percent of the charge, diisobutylene=12.5; isobutylene=23.3 and a minor amount of isobutane. Liquid recovery was 98.6 percent by weight of the charge.

Example 7

A charge stock containing over 99% by volume ethylbenzene was subjected, in vapor phase, to the catalyst described in Example 4 at 450° C., a liquid hourly space velocity (v./v./hr.) of 0.38 and atmospheric pressure. No hydrocarbons having 7 carbon atoms or less were obtained. Analysis of the product proved the fraction boiling in the xylene range to be substantially pure ethylbenzene, over 99% by volume, and no o-xylene, m-xylene or p-xylene was observed.

In the foregoing examples minor amounts of coke deposition on the catalyst, generally amounting to less than 0.5% by weight of the charge stock, was observed. After long operation the catalyst is advantageously regenerated by heating in air to about 500° C. to burn off the coke. In general, high liquid hourly space velocities prevent coke deposition, so that at a space velocity (v./v./hr.) of 10 coke deposition is about ½ that obtained at a space velocity (v./v./hr.) of 1.

Attention is now directed to the accompanying figure which is a graph showing the total conversion in weight percent, i. e., the total weight percentage of butylated aromatics which were debutylated in the process, plotted against ethylbenzene recovered in weight percent, i. e., the weight percentage of ethylbenzene recovered by the debutylation of tertiary butylethylbenzene, based on the potential ethylbenzene in the charge, i. e., the amount of ethylbenzene recoverable if all the t-butylethylbenzene was debutylated. The dash line shows the results which would be obtained if the tertiary butylethylbenzene were debutylated to the same extent as the tertiary butylxylenes. As shown by the figure, at a total conversion above about 20%, the amount of tertiary butylethylbenzene converted to ethylbenzene is less than would be expected and the difference becomes greater as the total conversion increases up to about 91%, above which the conversion of tertiary butylethylbenzene approaches that which would be expected. Also as shown by the figure, the proportion of tertiary butylethylbenzene unaffected is greatest in the region of from about 60% to about 90% total conversion, and hence it is preferred to correlate the operating conditions, namely, the catalyst activity, temperature, pressure, and liquid hourly space velocity, so that the total conversion of aromatic hydrocarbons having a tertiary alkyl substituent attached to the nucleus through a benzene carbon atom is between 60% and 90% by weight.

In operating the process, it is advantageous to obtain a high yield of olefin corresponding to the cleaved t-alkyl radical, since the olefin can be used to alkylate additional quantities of aromatics or can be used in other processes. It has been found that high olefin recovery is enhanced by the use of relatively low temperatures and high liquid hourly space velocities in order to obtain a high isobutylene to isobutane ratio in the products. It is preferred to employ a liquid hourly space velocity (v./v./hr.) of from 5 to 12 at a temperature of from 390 to 450° C. in order to obtain a high olefin yield and to maintain the total conversion of aromatics within the desired range. These ranges are especially useful when using a catalyst having a relatively high activity, such as the silica-alumina catalyst employed in the foregoing examples.

The foregoing examples and figure illustrate the process of the present invention and results obtained therewith. When other mixtures of dialkyl aromatics and isomers thereof which are trialkyl aromatics are employed in the process as above described, substantially similar results are obtained therewith, i. e., the quantity of the dialkyl aromatic dealkylated by scission of the tertiary alkyl radical is substantially less than would be expected from the total conversion obtained, so that by correlating the operating conditions so that the total conversion of the polyalkyl aromatics is from 20% to 91%, and preferably from 60% to 90%, the concentration of the dialkyl aromatic in the unaffected residue is substantially increased.

In the process of the present invention, some isomerization of the dialkyl aromatic products to form other dialkyl aromatics may be observed, but in no instance has the conversion of the dialkyl prducts to the monoalkyl product been observed, nor has isomerization of the monoalkyl product to the dialkyl product been observed. A specific attempt to isomerize ethylbenzene to xylene under the conditions employed in the foregoing examples failed to yield any xylene, as shown by Example 7.

The invention claimed is:

1. Process of concentrating a dialkyl aromatic hydrocarbon from admixture with an isomeric trialkyl aromatic hydrocarbon, said dialkyl and trialkyl aromatic hydrocarbons having the formulas

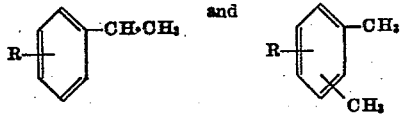

respectively, wherein R is an alkyl radical attached to a carbon atom of the aromatic ring through a tertiary carbon atom, which comprises contacting, in vapor phase, a hydrocarbon mixture containing said dialkyl and trialkyl aromatics with a dealkylating catalyst under dealkylating conditions effective to dealkylate not more than 91% of said dialkyl and trialkyl aromatics, and recovering a mixture of unaffected alkyl aromatic hydrocarbons having an increased concentration of said dialkyl aromatic hydrocarbon.

2. Process according to claim 1 wherein R is a tertiary butyl alkyl radical.

3. Process according to claim 1 wherein R is a tertiary amyl alkyl radical.

4. Process according to claim 1 wherein R is a tertiary hexyl alkyl radical.

5. Process according to claim 1 wherein R is a tertiary heptyl alkyl radical.

6. Process according to claim 1 wherein R is a tertiary octyl alkyl radical.

References Cited in the file of this patent

UNITED STATES PATENTS

| | | |
|---|---|---|
| 2,382,506 | Schulze | Aug. 14, 1945 |
| 2,603,662 | Stevens | July 15, 1952 |
| 2,648,713 | Schneider | Aug. 11, 1953 |